US006784636B1

(12) United States Patent
Partington

(10) Patent No.: US 6,784,636 B1
(45) Date of Patent: Aug. 31, 2004

(54) MULTI-CELL BATTERY

(75) Inventor: Kenneth Michael Partington, Longridge (GB)

(73) Assignee: ESRMCO Inc., Wilmington, DE (US)

(*) Notice: Subject to any disclaimer, the term of this patent is extended or adjusted under 35 U.S.C. 154(b) by 0 days.

(21) Appl. No.: 10/111,360

(22) PCT Filed: Oct. 26, 2000

(86) PCT No.: PCT/GB00/04117

§ 371 (c)(1), (2), (4) Date: Sep. 30, 2002

(87) PCT Pub. No.: WO01/31729

PCT Pub. Date: May 3, 2001

(30) Foreign Application Priority Data

Oct. 27, 1999 (GB) ............................................ 9925361

(51) Int. Cl.[7] .................................................. H02J 7/00

(52) U.S. Cl. ....................................... 320/107; 320/112

(58) Field of Search ................................ 320/107, 112; 429/9, 61, 149, 150, 160, 178

(56) References Cited

U.S. PATENT DOCUMENTS

| | | | | |
|---|---|---|---|---|
| 5,002,840 A | | 3/1991 | Klebenow et al. | 429/9 |
| 5,162,164 A | * | 11/1992 | Dougherty et al. | 429/9 |
| 5,223,351 A | * | 6/1993 | Wruck | 429/9 |
| 5,866,274 A | | 2/1999 | Mawston et al. | 429/9 |

FOREIGN PATENT DOCUMENTS

| | | |
|---|---|---|
| GB | 1442995 | 2/1972 |
| GB | 2 255 670 A | 4/1992 |
| WO | WO90/16090 A | 12/1990 |

OTHER PUBLICATIONS

Patent Abstracts of Japan vol 014, No. 493 (E–0995) Oct. 26, 1990 02–204975.

Internaional Search Report for PCT/GB 00/04117, Jan. 25, 2001.

* cited by examiner

*Primary Examiner*—Lawrence Luk
(74) *Attorney, Agent, or Firm*—Myers Bigel Sibley & Sajovec

(57) ABSTRACT

A multi-cell battery includes a battery box having at least three battery plate compartments, wherein the plates in one compartment lie in planes substantially perpendicular to plates in the other two compartments. The compartments can be of rectangular shape and arranged with the length direction of one compartment substantially perpendicular to the length direction of the other two compartments.

16 Claims, 3 Drawing Sheets

10
13
15
17
14
12
11
16

MULTI-CELL BATTERY

CROSS-REFERENCE TO RELATED APPLICATIONS

The present application is a U.S. national phase application of PCT International Application No. PCT/GB00/04117, having an international filing date of Oct. 26, 2000 and claiming priority to Great Britain Application No. 9925361.9 filed Oct. 27, 1999. The above PCT International Application was published in the English language and has International Publication No. WO 01/31729.

This invention relates to a battery of a kind comprising a plurality of cells and in particular, although not exclusively, to a battery of a kind comprising pairs of cathode and anode plates immersed in an electrolyte, e.g. a lead-acid type battery.

Commonly a multi-cell lead-acid battery comprises a plurality of pairs of plates arranged side by side in adjacent compartments disposed transversely to the length of a rectangular shape batter box. The plates in adjacent compartments are connected in series, and plates of the end compartments respectively provide positive and negative battery terminals.

For use in some applications, such as a stand-by power supply for telecommunication equipment, it is advantageous to arrange that the two terminals are provided adjacent one narrow end side of the rectangular battery box. This allows for ease of connection when a plurality of batteries are stored in situ side-by-side on a shelf in a rack, and allows easy disconnection and removal of a battery. This has been achieved with monoblocs with an even number of cells, but not in the case of an odd number of cells.

In the case of an odd number of cells various proposals have been put forward for conveniently and safely running a conductor along the length of the battery box so that a conventional terminal position at one end of the box is extended to a position near the other terminal at the other end of the battery box.

Although the known proposals for arranging two terminals to lie at a common end of a battery box are convenient and safe, they inevitably involve additional cost and weight, particularly the cost and weight of a conductor which is required to run along the length of the battery box.

The present invention seeks to provide an improved multi-cell battery, particularly but not necessarily one with an odd number of cells, in which the aforedescribed difficulties are mitigated or overcome.

In accordance with one aspect of the present invention a multi-cell battery comprises a battery box comprising at least three battery plate compartments wherein the plates in one compartment lie in planes substantially perpendicular to plates in the other two compartments.

In the case of a lead-acid battery in which, conventionally, the plates lie in vertical planes, the plates in said one compartment will therefore lie perpendicular relative to the plates in said other two compartments when viewed in plan. The invention however is not limited in scope to requiring vertical orientation of plates and in the case, for example, of a battery having a gel type electrolyte, at least some of the plates may lie in horizontal planes.

Preferably, in accordance with the invention, said other two compartments lie side-by-side and the plates thereof are connected electrically in series via the plates in said one compartment.

The compartments may each be of a rectangular shape and, especially in the case of two compartments which lie side-by-side, the length direction of said one compartment preferably is equal to the sum of the widths of said other two compartments plus the thickness of the partition wall(s) between the side-by-side compartments.

All three compartments, as viewed in plan, in a plane perpendicular to the plates of the three compartments, may be of the same width and length dimensions. Accordingly they may be arranged as a group of three adjacent compartments having a group length which is one and a half times the length of an individual compartment and a group width which equals the length of an individual compartment.

The battery may comprise additional pairs of battery plate compartments, i.e. it may have an uneven number of compartments greater than or equal to three. The additional pairs typically will be arranged side-by-side and aligned with said other two compartments.

Conventionally battery cell compartments are of a rectangular shape as considered in a plane perpendicular to the plane of each plate in that compartment, but that is not an essential requirement, and the present invention also may be employed in relation to a battery in which at least one compartment is non-rectangular.

The invention provides also a compartmented box for use in a multi-cell battery of the present invention.

Two embodiments of the present invention will now be described, by way of example only, with reference to the accompanying diagrammatic drawings, in which.

Figure 1:
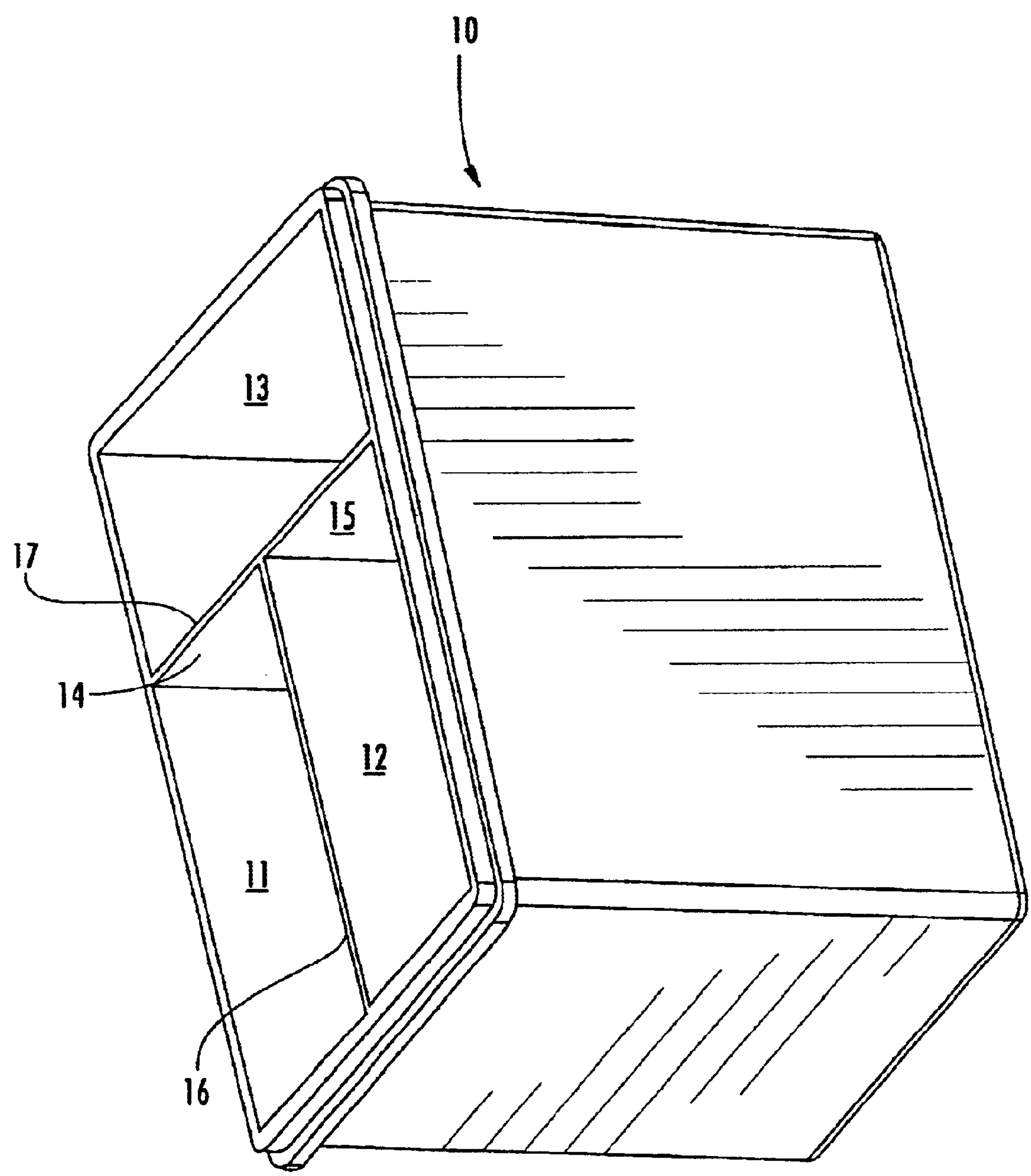
FIG. 1 is a perspective view of a battery box of the present invention.

A battery box 10 of conventional moulded thermo-plastic material comprises three battery cell compartments 11, 12, 13 each of the same length, width and height.

Two compartments 11, 12 are arranged side-by-side. The third compartment 13 has the length direction thereof perpendicular to the length direction of the other compartments 11, 12. Ends 14, 15 of the two side-by-side compartments lie alongside a longer side of the compartment 13.

The box is moulded integrally with two partition walls 16, 17. Wall 16 provides a boundary between the side-by-side compartments 11, 12. Wall 17 provides a boundary between the compartment 13 and the ends 14, 15 of the side-by-side compartments 11, 12.

The length of each of the equi-sized compartments 11, 12, 13 is twice the width thereof plus the thickness of the partition wall 16 which acts as a common boundary between the side-by-side compartments.

Figure 2:
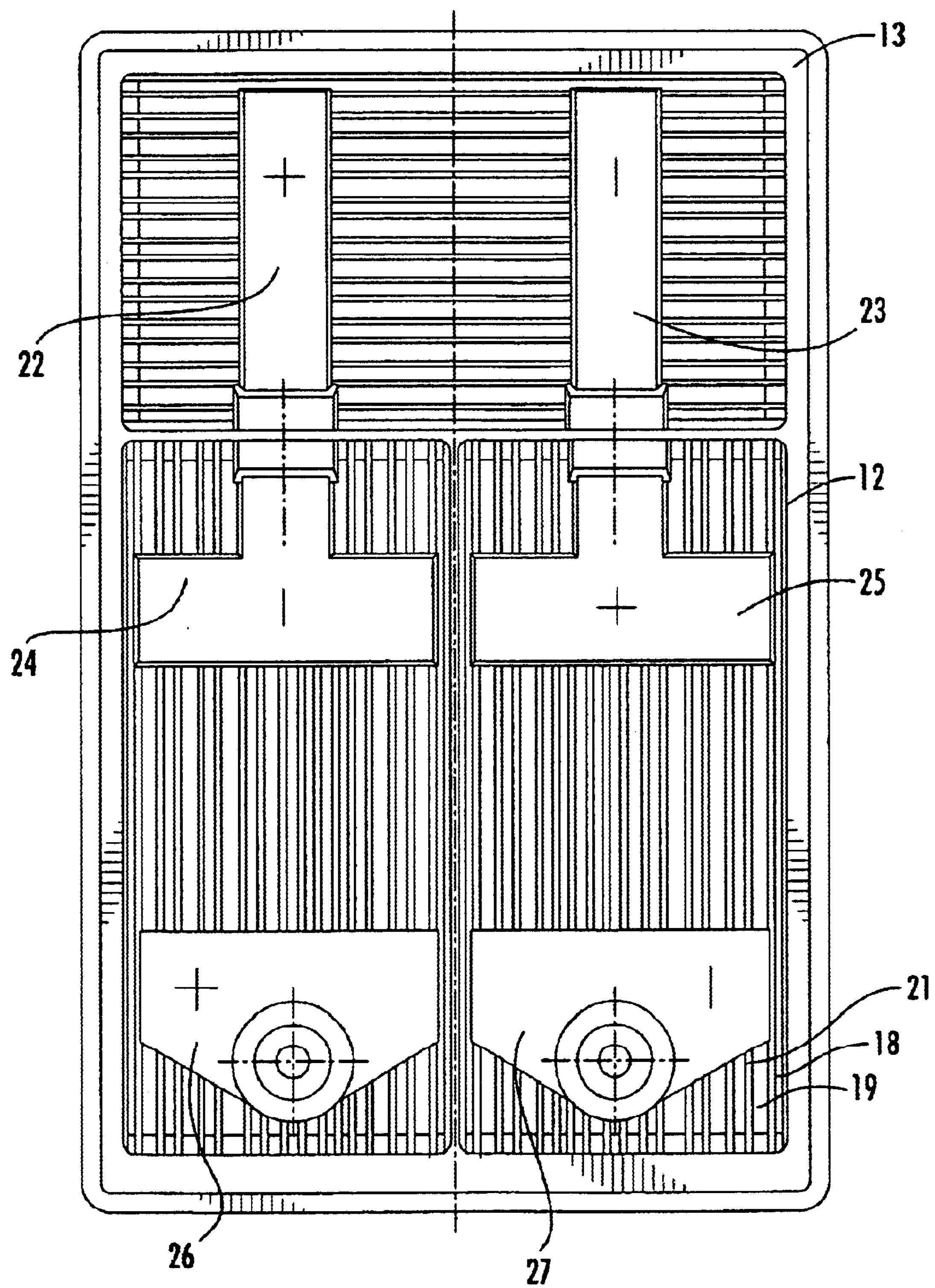
FIG. 2 is a plan view of part of a battery comprising the box of FIG. 1.

Each compartment 11, 12, 13 is filled in conventional manner with pluralities of pairs of cathode and anode plates 18, 19 interposed with separators and electrolyte 21 (see FIG. 2).

Negative plates at end 14 of compartment 11 are connected to positive plates of compartment 13 by connectors 22, 24. Negative plates of compartment 13 are connected to positive plates of compartment 12 by connector 23, 25. Thus the battery terminals 26, 27 lie side-by-side at a common end of the battery box, and three cells are interconnected in series by the connectors 22, 23, 24, 25.

A cover, not shown, is provided over the cell compartments in a manner known per se, and optionally the cover may provide a seal to allow the electrolyte to be contained within the cell compartments at a pressure slightly greater than atmospheric pressure.

Orientation of the cell compartments as herein described therefore enables the terminals to be positioned side-by-side at a common end or edge of the battery without the conventional need to provide a connector running the length of the battery box.

Figure 3:
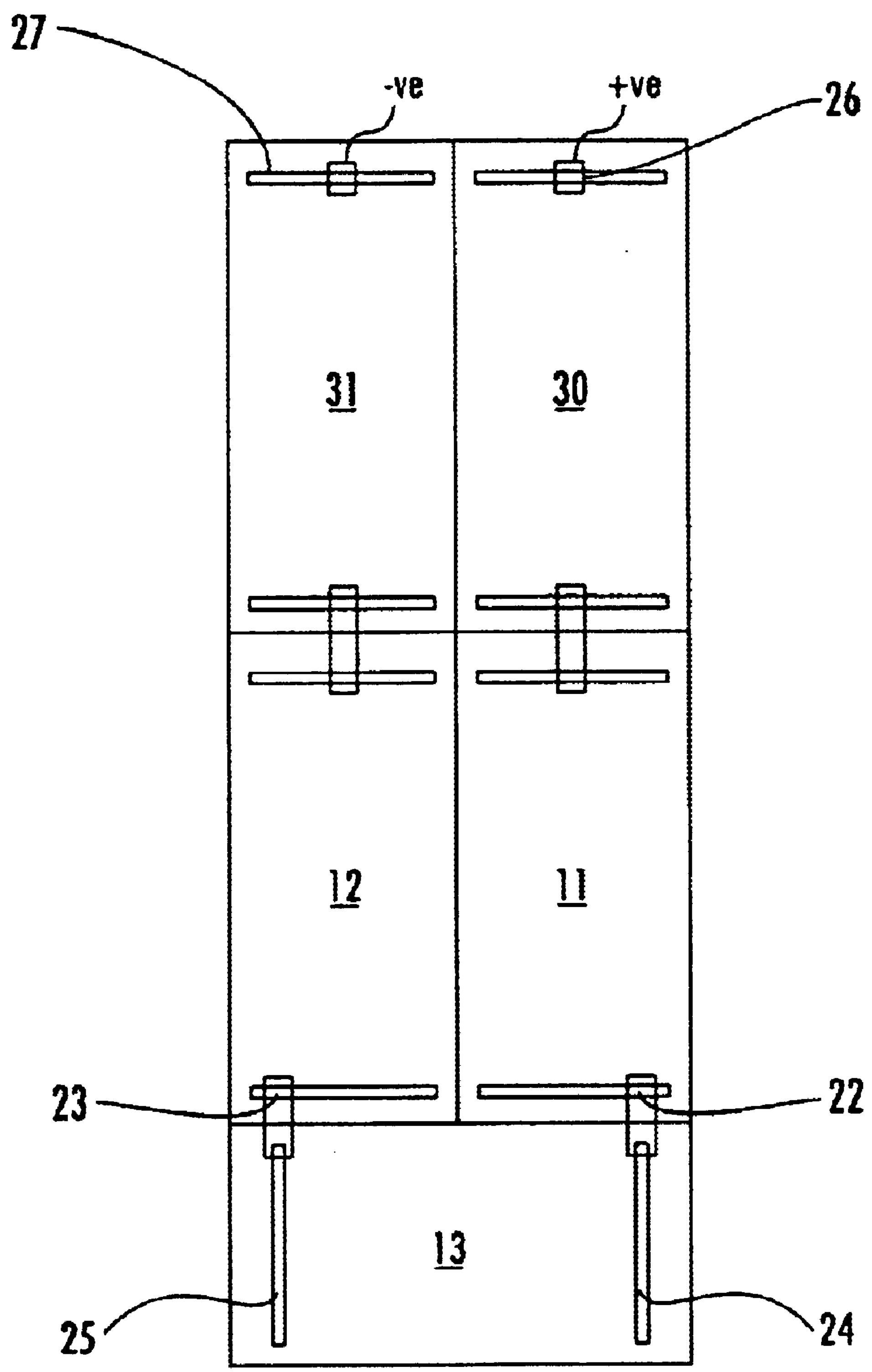
FIG. 3 is a plan view of a battery in accordance with another embodiment of the invention.

FIG. 3 shows a second embodiment in which a five cell battery (plates not shown) is provided by adding a pair of additional side-by-side compartments 30, 31 to the compartments 11, 12, 13 of FIG. 2.

What is claimed is:

1. A multi-cell battery comprising a battery box comprising at least three battery plate compartments, wherein the plates in one compartment lie in planes substantially perpendicular to plates in the other two compartments and the plates of said other two compartments are connected electrically in series via the plates of said one compartment, wherein said other two compartments lie side-by-side, and wherein each said compartment is of rectangular shape and the length direction of said one compartment is equal to the sum of the widths of said other two compartments and the thickness of the partition wall(s) between the side-by-side compartments.

2. A battery according to claim 1, wherein, in use, the plates in said one compartment lie perpendicular relative to the plates in said other two compartments when viewed in plan.

3. A battery according to claim 1 wherein the battery box comprises at least one additional pair of battery plate compartments.

4. A battery according to claim 3, wherein said additional pair of compartments comprises two compartments arranged side-by-side and aligned with, said other two compartments.

5. A battery box for a multi-cell battery and comprising at least three battery plate compartments each of rectangular shape and arranged with the length direction of one compartment substantially perpendicular to the length direction of the other two compartments, wherein said other two compartments lie side-by-side adjacent one another and said one compartment has a longer side thereof arranged adjacent end sides of said other two compartments, and wherein the length direction of said one compartment is equal to the sum of the widths of said other two compartments and the thickness of the first partition wall.

6. A battery box according to claim 5, wherein the box comprises a first partition wall that serves as a boundary between the two compartments that lie side-by-side.

7. A battery box according to claim 5, wherein the box comprises a second partition wall that serves as a boundary between said one compartment that said other two compartments.

8. A battery box according to claim 5, wherein said three battery plate compartments are of the same width and length dimensions.

9. A battery box according to claim 5, and comprising a cover adapted to extend over the battery cell compartments.

10. A battery box according to claim 9, wherein the cover is sealable to allow the compartments to contain electrolyte at a pressure greater than atmospheric pressure.

11. A multi-cell battery comprising a battery box comprising at least three substantially rectangular battery plate compartments, each of the compartments having a length dimension and a width dimension that differs from the length dimension, wherein the plates in one compartments lie in planes substantially perpendicular to plates in the other two compartments and the plates of said other two compartments are directly connected electrically in series via the plates of said one compartment, wherein, when viewed in plan, in a plane perpendicular to the plates of the three compartments, all three of said battery plate compartments are of the same width and length dimensions.

12. A battery according to claim 11, wherein said other two compartments lie side-by-side.

13. A battery according to claim 12, wherein the length direction of said one compartment is equal to the sum of the widths of said other two compartments and the thickness of the partition wall(s) between the side-by-side compartments.

14. A multi-cell battery comprising a battery box comprising at least three substantially rectangular battery plate compartments, each of the compartments having a length dimension and a width dimension that differs from the length dimension, wherein the plates in one compartment lie in planes substantially perpendicular to plates in the other two compartments and the plates of said other two compartments are connected electrically in series via the plates of said one compartment, wherein, when viewed in plan, in a plane perpendicular to the plates of the three compartments, all three of said battery plate compartments are of the same width and length dimensions, and said other two compartments lie side-by-side.

15. A battery according to claim 14, wherein the length direction of said one compartment is equal to the sum of the widths of said other two compartments and the thickness of the partition wall(s) between the side-by-side compartments.

16. A battery according to claim 14 wherein the battery box comprises at least one additional pair of battery plate compartments.

* * * * *

UNITED STATES PATENT AND TRADEMARK OFFICE

CERTIFICATE OF CORRECTION

PATENT NO. : 6,784,636 B1
DATED : August 31, 2004
INVENTOR(S) : Partington

It is certified that error appears in the above-identified patent and that said Letters Patent is hereby corrected as shown below:

Column 4,
Line 14, should read -- length dimension, wherein the plates in one compartment --

Signed and Sealed this

Seventh Day of June, 2005

JON W. DUDAS
*Director of the United States Patent and Trademark Office*